United States Patent [19]

Hill, Jr. et al.

[11] Patent Number: 4,524,729
[45] Date of Patent: Jun. 25, 1985

[54] PRIMARY MANWAY CLOSURE REDUNDANT RESTRAINT

[75] Inventors: Frank P. Hill, Jr., Signal Mountain; John W. Alden, Jr., Chattanooga; Harry K. Williams, Signal Mountain, all of Tenn.

[73] Assignee: Combustion Engineering, Inc., Windsor, Conn.

[21] Appl. No.: 440,886

[22] Filed: Nov. 12, 1982

[51] Int. Cl.³ .............................................. F23M 7/00
[52] U.S. Cl. .................................. 122/498; 292/256.6; 292/256.67; 220/319; 220/327; 220/328; 376/203; 376/205; 376/463
[58] Field of Search ............... 49/463; 220/319, 320, 220/325, 327, 328; 292/256.6, 256.67, 256.73; 376/202, 203, 205, 463; 122/498

[56] References Cited

U.S. PATENT DOCUMENTS

| | | | |
|---|---|---|---|
| 1,329,700 | 2/1920 | Deck | 220/325 |
| 2,064,569 | 12/1936 | Santucci | 220/236 |
| 2,665,877 | 1/1954 | MacGregor | 292/256.6 |
| 4,253,583 | 3/1981 | Lynch | 292/256.6 |
| 4,331,251 | 5/1982 | Berman et al. | 220/320 |
| 4,398,649 | 8/1983 | Labbe | 220/327 |

FOREIGN PATENT DOCUMENTS 233135 5/1925 United Kingdom ............ 220/46 R

Primary Examiner—Harvey E. Behrend
Assistant Examiner—Richard W. Wendtland
Attorney, Agent, or Firm—Robert L. Olson

[57] ABSTRACT

In combination, a vessel (10), opening means (16) in the vessel, a cover (18), flange means (20) surrounding the opening means, a primary closing means (22, 24) for the cover including a plurality of studs (22) securing the cover onto the vessel, the studs having inner ends threaded into openings (26) in the vessel, nuts (24) cooperating with the outer ends of each of the studs, secondary closing means (32, 34, 38, 40) for the cover including cylindrical clamp means (30, 32) made up of more than one piece, a protruding ledge (34) on the cover over which the clamp means extends, an annular groove (36) in the flange means into which the clamp means extends, a circular retaining ring (38) which surrounds the clamp means, a plurality of threaded openings (42) in the retaining ring, and a plurality of set screws (40) threaded into the openings, so that their ends force the clamp means into tight clamping engagement with the ledge on the cover and the groove in the flange means.

The combination set forth above, including a groove (43) in the outer surface of the retaining ring, into which the ends of set screws come into contact.

The combination set forth above, further including a plurality of spacer lugs (44) attached to the retaining ring, which spacer lugs contact the vessel so as to accurately position the retaining ring with respect to the clamp means.

5 Claims, 3 Drawing Figures

PRIMARY MANWAY CLOSURE REDUNDANT RESTRAINT

BACKGROUND OF THE INVENTION

Removable covers for openings in vessels containing pressurized fluids presents a hazard, in that the cover could be blown off causing injury to nearby personnel. An example is the cover on the manway of a nuclear steam generator.

SUMMARY OF THE INVENTION

In accordance with the invention, redundant apparatus is provided for removably holding the cover on the manway of a nuclear steam generator. A first and primary closing means is in the form of studs and nuts for securing the cover. A second closing means is a two-piece cylindrical clamp that fits over a protruding ledge on the cover plate and into a machined groove in the vessel. The two-piece clamp is held in place by a one-piece retaining ring which fits over the clamp and is tightened against the clamp by set screws. The two-piece clamp is designed to be able to resist the entire thrust of the pressure against the cover plate in the unlikely event of failure of all the studs.

DESCRIPTION OF THE PREFERRED EMBODIMENT

Figure 1:
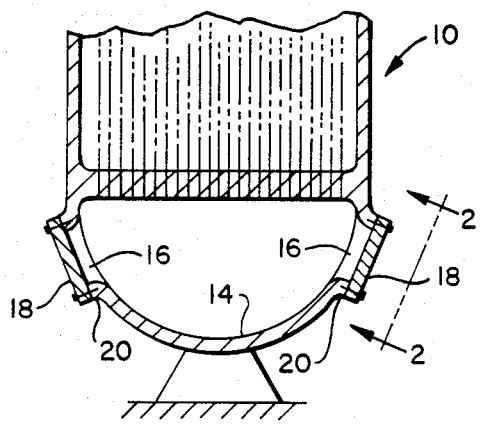
FIG. 1 is a partial side view of a nuclear steam generator showing the manway covers.

Looking now to FIG. 1, numeral 10 denotes the bottom portion of a nuclear steam generator, through which a radioactive, pressurized fluid is circulated to generate steam when the unit is in operation. In order to gain access to the inside of the shell or vessel 14 for inspection and repair purposes during shutdown periods, a pair of manway openings 16 are provided. These openings are sealed by covers 18 during normal operation of the nuclear steam generator. Because of the potential hazard of the pressurized radioactive fluid within the steam generator 10 if it were released, it is imperative that all chances of failure of the closing apparatus for covers 18 be eliminated. The redundant closing apparatus shown in FIGS. 2 and 3, and described below, meets these requirements.

Figure 2:
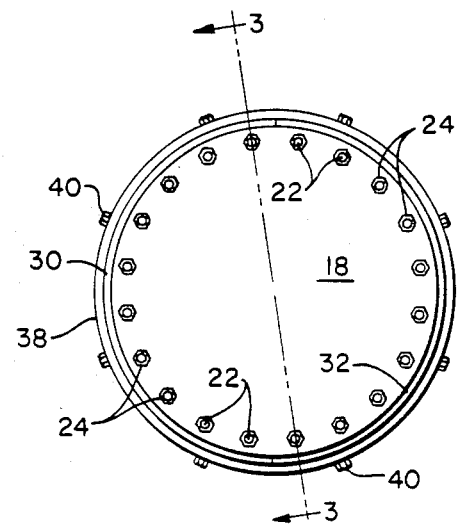
FIG. 2 is an enlarged view taken along lines 2—2 of FIG. 1.
Figure 3:
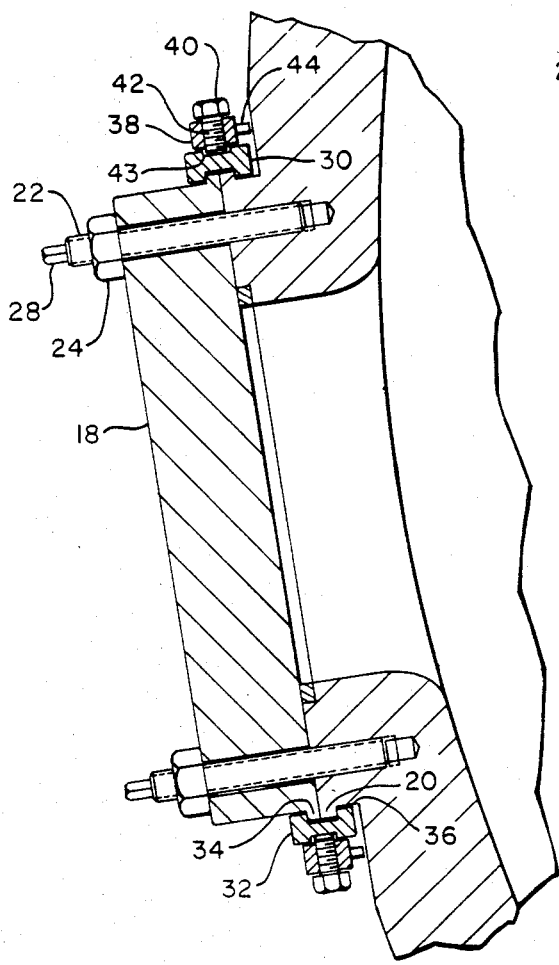
FIG. 3 is a sectional view taken on line 3—3 of FIG. 2.

Looking now to FIGS. 2 and 3, one of the covers 18 is shown in more detail. It is secured to the flange 20 of shell 14 by a primary closing means in the form of a multiplicity of studs 22 and nuts 24, therebeing 20 shown. The studs are threaded into threaded openings 26 in the flange 20. A suitable seal or gasket 21 is positioned between the cover and flange to insure that there is no leakage past the cover during operation of the unit. The studs 22 have a square outer end 28, so that a wrench can be used to place the studs tightly in the flange 20, and to remove them when desired.

A redundant, or secondary closing means for the cover is also provided, in the unlikely event that the first closing means fails; i.e., for example, if the threads of a sufficient number of the studs became stripped, so that the remaining good studs could not hold against the pressure within the shell 14. The secondary closure means consists of a clamp comprising two semi-cylindrical members 30 and 32. The clamp fits over a protruding ledge 34 on the cover plate 18, and into a machined groove 36 in the flange 20 of vessel 14. The two-piece clamp is held in place by a one-piece retaining rings 38 which fits over the clamp. The ring 38 is tightened against the clamp 30, 32 by eight set screws 40. These set screws 40 are threaded through threaded openings 42 in ring 38 and seat in groove 43 in ring 38. Four spaced lugs 44 are equidistantly attached to ring 38 to accurately locate the ring 38. The two-piece clamp is designed to be able to withstand the entire thrust of the pressure against the cover plate 18. Thus, if all of the studs 22 fail, the clamp 30, 32 will hold the cover plate 18 tightly sealed in place until the next inspection shutdown, at which time the impaired studs should be detected and replaced.

The sequence of assembly should be obvious from above. The cover plate 18 along with the seal 21 would initially be put in place. The studs 22 would then be put in place with the proper tension, and nuts 24 would be tightened. Split clamp 30, 32 would then be positioned, and retaining ring 38 flipped thereover. The set screws 40 would finally be adjusted to tighten the retaining ring 38 against the clamps 30, 32. Disassembly would be accomplished in the reverse order.

We claim:

1. In combination, a vessel, opening means in the vessel, a cover, flange means surrounding the opening means, a primary closing means for the cover including a plurality of studs securing the cover onto the vessel, the studs having inner ends threaded into openings in the vessel, nuts cooperating with the outer ends of each of the studs, secondary closing means for the cover including cylindrical clamp means made up of more than one piece, a protruding ledge on the cover over which the clamp means extends, an annular groove in the flange means into which the clamp means extends, a circular retaining ring which surrounds the clamp means, a plurality of threaded openings in the retaining ring, and a plurality of set screws threaded into the openings, so that their ends force the clamp means into tight clamping engagement with the ledge on the cover and the groove in the flange means.

2. The combination set forth in claim 1, including a groove in the outer surface of the retaining ring, into which the ends of the set screws come into contact.

3. The combination set forth in claim 2, including a plurality of spacer lugs attached to the retaining ring, which spacer lugs contact the vessel so as to accurately position the retaining ring with respect to the clamp means.

4. The combination set forth in claim 2, wherein the clamp means is C-shaped in cross-section.

5. The combination set forth in claim 3, wherein the vesel is a nuclear steam generator.

* * * * *